United States Patent [19]
Choi

[11] Patent Number: 5,161,012
[45] Date of Patent: Nov. 3, 1992

[54] MULTI-SCREEN GENERATION CIRCUIT

[75] Inventor: Hoon-Sun Choi, Seoul, Rep. of Korea

[73] Assignee: Samsung Electronics Co., Ltd., Suwon, Rep. of Korea

[21] Appl. No.: 638,145

[22] Filed: Jan. 9, 1991

Related U.S. Application Data

[63] Continuation of Ser. No. 387,591, Jul. 31, 1989, abandoned.

[30] Foreign Application Priority Data

Jul. 30, 1988 [KR] Rep. of Korea ............ 9677/1988[U]

[51] Int. Cl.$^5$ ..................... H04N 9/74; H04N 5/262; H04N 5/272
[52] U.S. Cl. ................... 358/183; 358/181; 358/22
[58] Field of Search ............... 358/22, 183, 182, 187, 358/160

[56] References Cited

U.S. PATENT DOCUMENTS

| | | |
|---|---|---|
| 4,636,864 | 1/1987 | Annegarn et al. ............ 358/22 |
| 4,758,892 | 7/1988 | Bloomfield ................ 358/22 |
| 4,782,391 | 11/1988 | McNeely et al. ............ 358/22 |
| 4,839,728 | 6/1989 | Casey .................... 358/22 |
| 5,016,106 | 5/1991 | Yong-Je et al. ............ 358/22 |

Primary Examiner—Tommy P. Chin
Assistant Examiner—Michael H. Lee
Attorney, Agent, or Firm—Robert E. Bushnell

[57] ABSTRACT

There is disclosed a multi-screen generating circuit capable of freely displaying on a main screen a plurality of multi-screens corresponding to 4 sub-screens, 9 sub-screens, 13 sub-screens and 16 sub-screens according to size of the main screen, the circuit also being capable of giving free choices in selecting any type of multi-screens regardless of the number of broadcasting channels which may differ from one region to another. The inventive subject to carry out the object of the invention includes: a command decoder 10, an address signal generator 20, a writing reference signal generation circuti(WRS) 30, a writing display controller 140, an analog-to-digital clock generator 188, a first multiplexer 60, a serial-parallel converter 50(SPC) 50, a write timing generator 70, a read timing generation circuit 80, a latch section 90, and a data multiplexer 100.

17 Claims, 7 Drawing Sheets

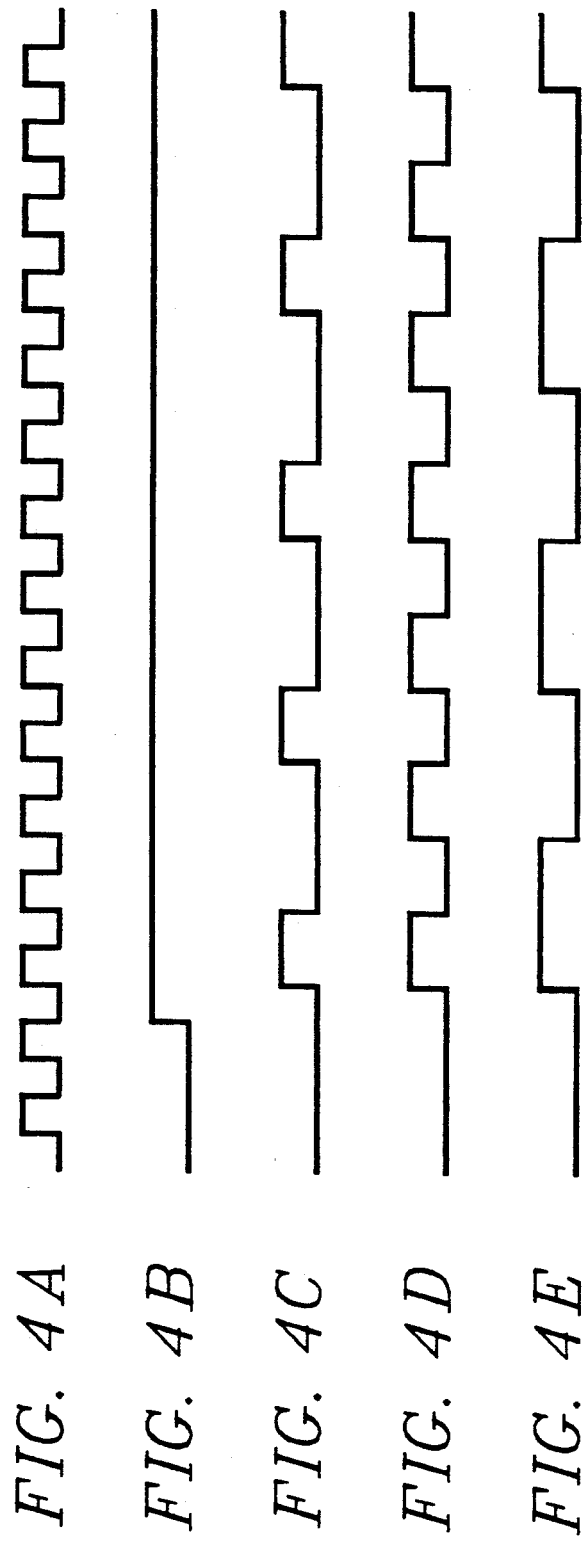
FIG. 4A
FIG. 4B
FIG. 4C
FIG. 4D
FIG. 4E
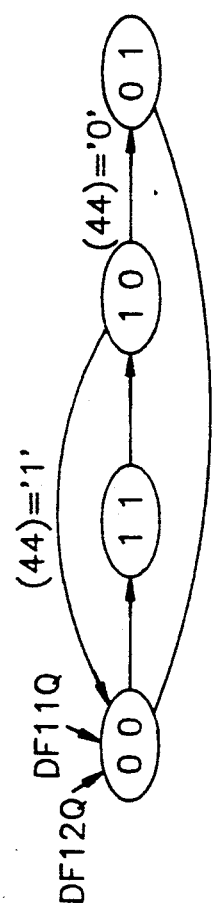
FIG. 5

FIG. 7A
FIG. 7B
FIG. 7C
FIG. 7D
FIG. 7E
FIG. 7F

MULTI-SCREEN GENERATION CIRCUIT

This is a continuation of application Ser. No. 07/387,501 filed on Jul. 31, 1989, now abandoned.

BACKGROUND OF THE INVENTION

The present invention relates to a digital video signal processing circuit in a color television set(CTV) and a video tape recorder(VTR), specifically to a multi-screen generation circuit capable of displaying 4 to 16 different picture sources in multi-screen of a common monitor at a user's choice depending on size of the monitor and provides free choices of broadcasting channels when used in a multi-channel mode, in which the number of channels may differ from one region to another.

In general, the CTV and the, i.e. the VTR products, which employ a new technology of displaying multi-screen on a single monitor, are being introduced in Europe, America and Japan. The multi-screen can provide different types of screens, such as 4-screen, 9-screen, 12-screen or 16-screen, on one monitor; a multi-screen CTV may have one or more of these types depending on manufacturer.

However, in conventional multi-screen CTV, as screen type(s) are fixed to one or two of either 4-screen, 9-screen, 2-screen, or 16-screen mode, not only has the choice of multi-screens been very limited to the size of the monitor, but also screen scroll processing has been impossible.

OBJECT OF THE INVENTION

Therefore, it is an object of the present invention to provide a circuit capable of freely displaying on a main screen multi-screen sources corresponding to 4 sub-screens, 9 sub-screens, 13 sub-screens and 16 sub-screens according to size of the main screen.

It is another object of the present invention to provide a circuit capable of giving free choices in the number of channels regardless of the number of broadcasting channels which may differ from one region to another in case of using multi-channel.

BRIEF DESCRIPTION OF THE ATTACHED DRAWINGS

For a better understanding of the invention and to show how the same may be carried into effect, reference will now be made, by way of example, to the accompanying diagrammatic drawings, in which:

Figure ; is a system block diagram according to the present invention;

FIG. 4 is an operation timing diagram of FIG. 3 according to the present invention;

FIG. 5 is a counting state diagram of FIG. 3 according to the present invention;

FIG. 7 is a diagram of waveforms generated in said writing display controller 140 of FIG. 6 according to the present invention; and FIG. 8 is a diagram of actual composition of the multi-screens according to the present invention.

DETAILED DESCRIPTION OF THE INVENTION

Hereinafter the present invention is described in detail with reference to the attached drawings.

Figure 1:
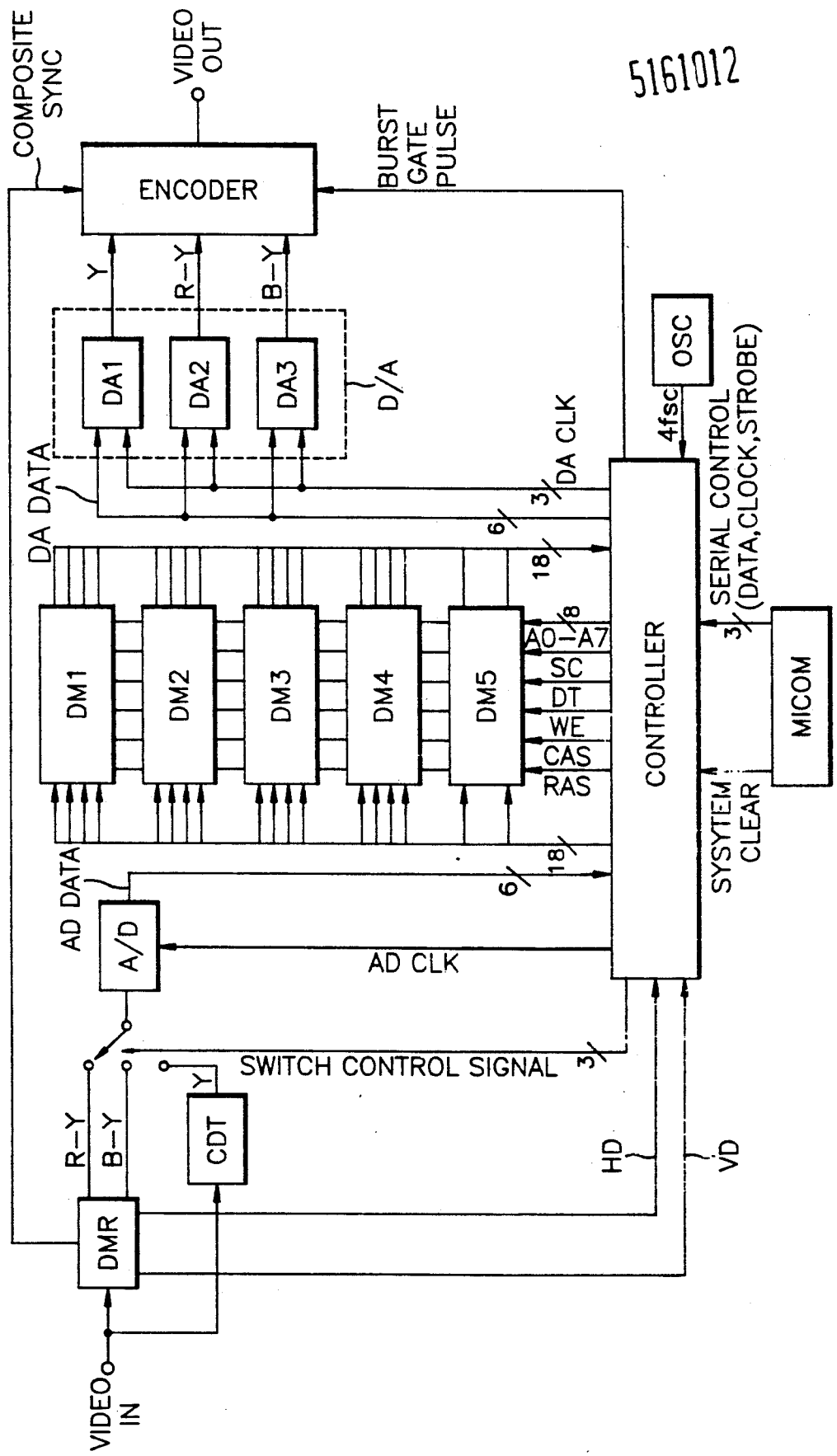

FIG. 1 is a system block diagram illustrating that video input signals are divided into R-Y, B-Y signals in a demodulator(DMR), that and Y signal is divided in color difference signal trapper(CDT), by trapping of fsc signals and that a controller receives serial control signals and system clear signal concerning a display mode generated from a microprocessor MICOM 16 and generates sampling clock signals(ADCLK, DACLK) according to output of a plurality of digital-to-analog converter (D/A) and an analog-to-digital converter. Digitized data of said analog-to-digital converter(A/D) is processed through the controller and stored in a plurality of dual-port memories DMI through DM5 according to the display mode selection data. Then, video signals for the multi-screen stored in dual-port memories DMI through DM5 are read out, analogized in the digital-to-analog converter DA1 through DA3, synchronized in burst gate pulses of the controller and encoded in an encoder, so that synthesized video signals are made to configure the entire multi-screen.

Figure 2:
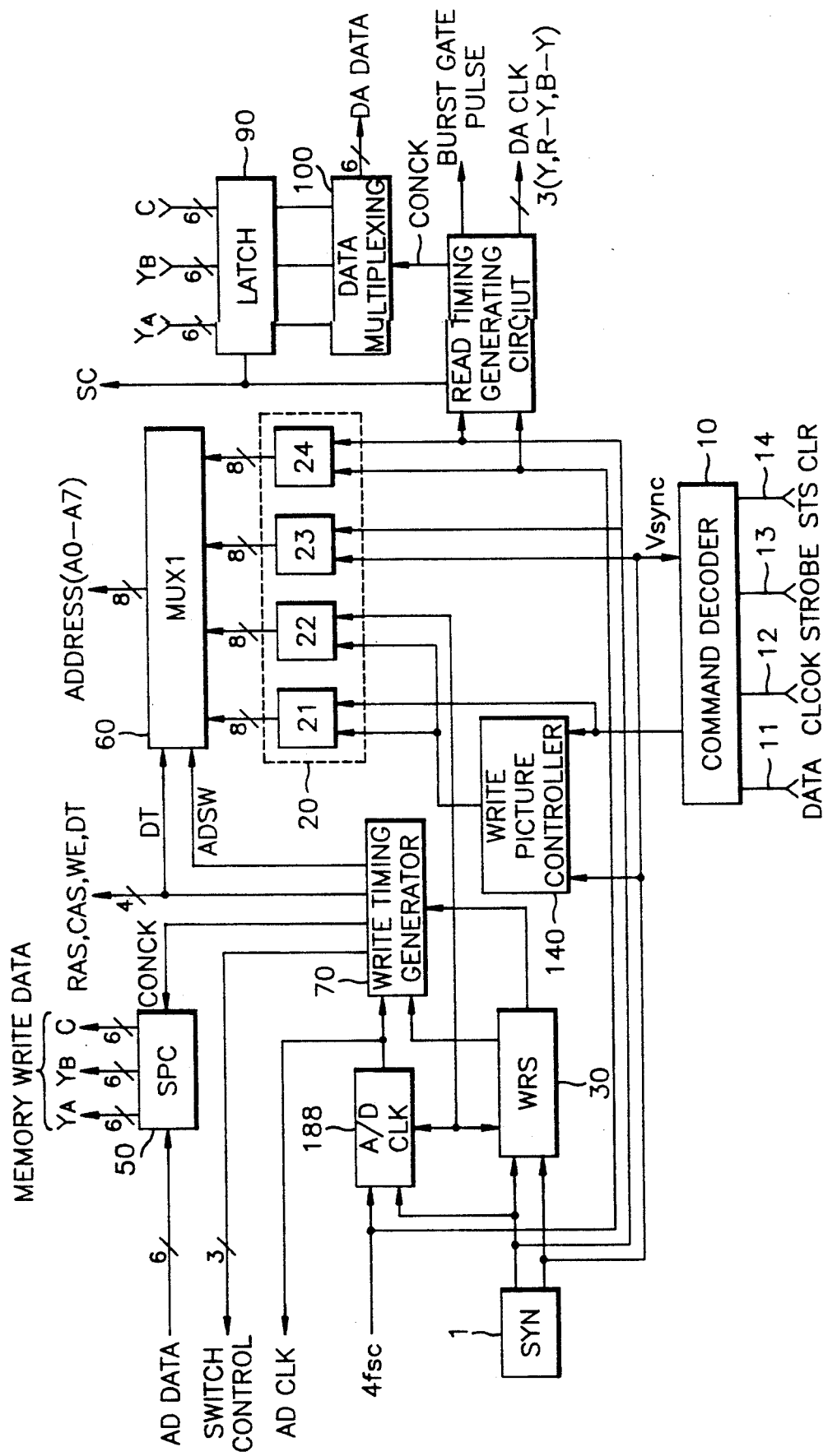
FIG. 2 is a diagrammatic block diagram according to the present invention.

Referring to FIG. 2, the block diagram of the present invention includes a command decoder 10 that receives a vertically synchronous signal V sync from synchronous signal generator(SYN) 1 and multi-screen mode command data together withserial control signals and system clear signal through the line 11-14 generated from said MICOM of FIG. 1, and after decoding them, generates display mode selection data 4p, 9p, 13p, 16p signals address signal generator 20 that includes row/-column writing and row/column reading address signal generation circuits (ASG) 21-24 which divide image data for displaying a number of multi-screen modes into each domain of the screen and generates writing address signals which are applied into dual-port memories (DM1-DM5) of FIG. 1 for reading/writing operation; a writing reference signal generation circuit(WRS) 30 that transmits a vertically/horizontally synchronous signal, which is generated in the synchronous signal generator 1, and reading reference signal corresponding with writing after receiving display mode data from the command decoder 10; a write picture controller 140 that receives vertically synchronous signal Vsync from the synchronous signal generator 1 and displays mode data of the command decoder 10, then designates row/-column writing address signal generators 21, 22 of the address signal generator 20 to be written with display mode data and controls the address generation of data to write; an analog-to-digital clock generator(A/D CLK) 188 that receives horizontally synchronous signals generated from video signals of the synchronous signal generator 1 together with signals of 4×3.58 MHz of a basic clock terminal (4 fsc) and display mode data of the command decoder 10, then demultiplies respectively the 4×3.58 MHz clock signal according to the 1, 4, 9, 13, 16 screens(lp, 4p, 9p, 13p, 16p) selections and generates the clock signals of analog-to-digital converter of FIG. 1; a first multiplexer 60 that multiplexes address signals generated from the address signal generator 20 according to control and then applies it as address data to dual port memories DMI through DM5 of Figure 1; a serial-parallel converter (SPC) 50 that produces a digitized signal of the video signals by control of the dual port memories DMI through DM5, and serial luminance data and color data after converting to parallel luminance data to a first and a second luminance(YA, YB) terminal and a color terminal(CC) under the control of the serial-parallel converter 50; a write timing generator 70 that receives sampling clock signals (AD Clk) for digitizing video signals according to display mode selection of the analog-to-digital clock generator 188, and dual-port memory write-enable (MWE) signal and write- begin signals (WRB) of the writing reference signal generator 30, then generates control clock(CONCK) for first and second luminances signals selection of the serial-parallel converter 50 together with address switching and data transmission signals of a first multiplexer MUX1 60, and also generates a DT data transfer signal (DT) which runs a transmission control to R/CAS (Row/column Address Strobe), WE(Write Enable) of the dual-port memories and the register of a serial port; a read timing generation circuit 80 that receives horizontally synchronous signals (Esync) of the synchronous signal generator 1 and signals of reference clock section (4fsc), generates burst gate pulses of FIG. 1 and clock signals (DA CLK) of the digital-to-analog converter (D/A) and then generates serial clock signals (SC) and control clock-(CONCK) signals according to data read; a latch section 90 that outputs multi-screen data from addresses designated by generation of row/column reading address generation circuits 23, 24 of the address signal generator 20 according to a signal of serial clock (SC) column(SC) of read timing generation circuit 80, and then latches according to first and second luminances YA, YB and color C based on clock signals; and a data multiplexer 100 that multiplexing data of the latch section according to control clock of the read timing generation circuit(80) and then outputs to digital-to-analog converter D/A of FIG. 1.

Figure 3:
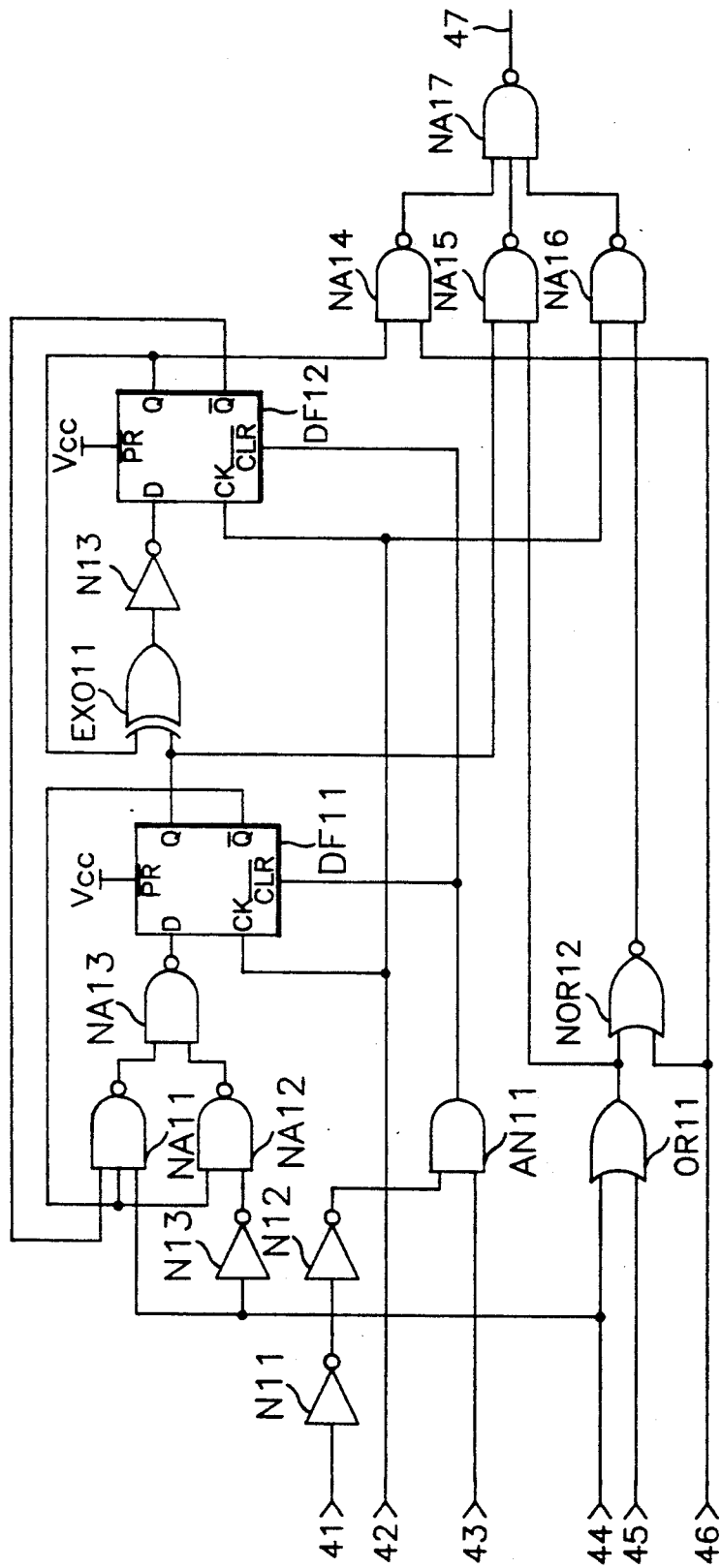
FIG. 3 is a detailed circuit diagram of analog-to-digital clock generator 188 of FIG. 2 according to the present invention.

FIG. 3 is a detailed circuit diagram of analog-to-digital clock generator 188 of Figure 2 of the present invention, in which: when a reset terminal (RESET) 41, a reference clock(4fsc) terminal 42, a horizontally synchronous signal terminal 43, and first through third display mode selection(9p, 4p, 16p) terminals 44, 45, 46 are connected to the command decoder 10 and, through the reset terminal 41, output that passed through invertors(N11, N12) and output of the horizontally synchronous signal terminal 43 is entered into AND gate AN11, output of AND gate AN 11 is entered into D-flip/flop DF11; and DF12, then the entire system is initialized; the first display selection terminal 44 is connected to the input port of NAND gate NA11 and through invertor N13, to input port of NAND gate 12; each output port of NAND gates NA11 through NA12 is connected to an input port of NAND gate NA13 and the output port of said NAND gate NA13 is connected to data port D of D-flip/flop DF11, whose output port Q is connected to an input port of NAND gate NA15 and an exclusive OR gate EX011; output port Q of D-flip-flop DF11 is connected to NAND gates NA11 and NA12 the output port of exclusive OR gate EXO11 is connected through the invertor N13 to data port D of a D-flip/flop DF12, whose output port Q then is connected to exclusive OR gate EX011 and NAND gate NA14; output port Q of DF12 is connected to the input port of NAND gate NA11 and first and second display mode selection terminals 44, 45 are connected to input ports of OR gate OR11, whose output port and third display mode selection terminal 46 are connected to input ports of NOR gate NOR12; the output port of OR gate OR11 and NOR gate NOR12 are connected to input ports of NAND gates NA15, NA16, respectively; and the output of NAND gates NA14 through NA16 generate, through a NAND gate NA17 to a clock output terminal 47, a signal which converts analog video signals to digital signals in accordance with a multi-screen mode selection.

FIG. 4 is an operation timing diagram of FIG. 3 according to the present invention, in which: (4a) waveform is a reference clock terminal 42 input signal(4fsc), (4b) waveform is an input signal of reset terminal 41 or horizontally synchronous signal of terminal 43, (4c) waveform is an output signal of the NAND gate NA17 if 9-screen mode is being written when logic of first through third display selection terminals 44, 45, 46 are high, low, low, respectively, (4d) waveform is an output signal of the NAND gate NA17 when 4-screen mode or 13th screen of 13-screen display is written when, in an input logic of first through third display mode selection terminals 44, 45, 46, the terminal 45 part is "high" and terminals 44, 46 are "low". (4e) waveform is an output signal of the NAND gate NA17 when 16 screen mode or if first through twelfth screens of 13-screen are written when, in an input logic of first through third display mode selection terminal 44, 45, 46, terminals 46 is "high", and the terminal 44, 45 are "low".

FIG. 5 is a diagram of shifts of counting state which is generated in output ports Q of the D-flip-flops DF11, DF12 of FIG. 3 of the present invention.

Figure 6:
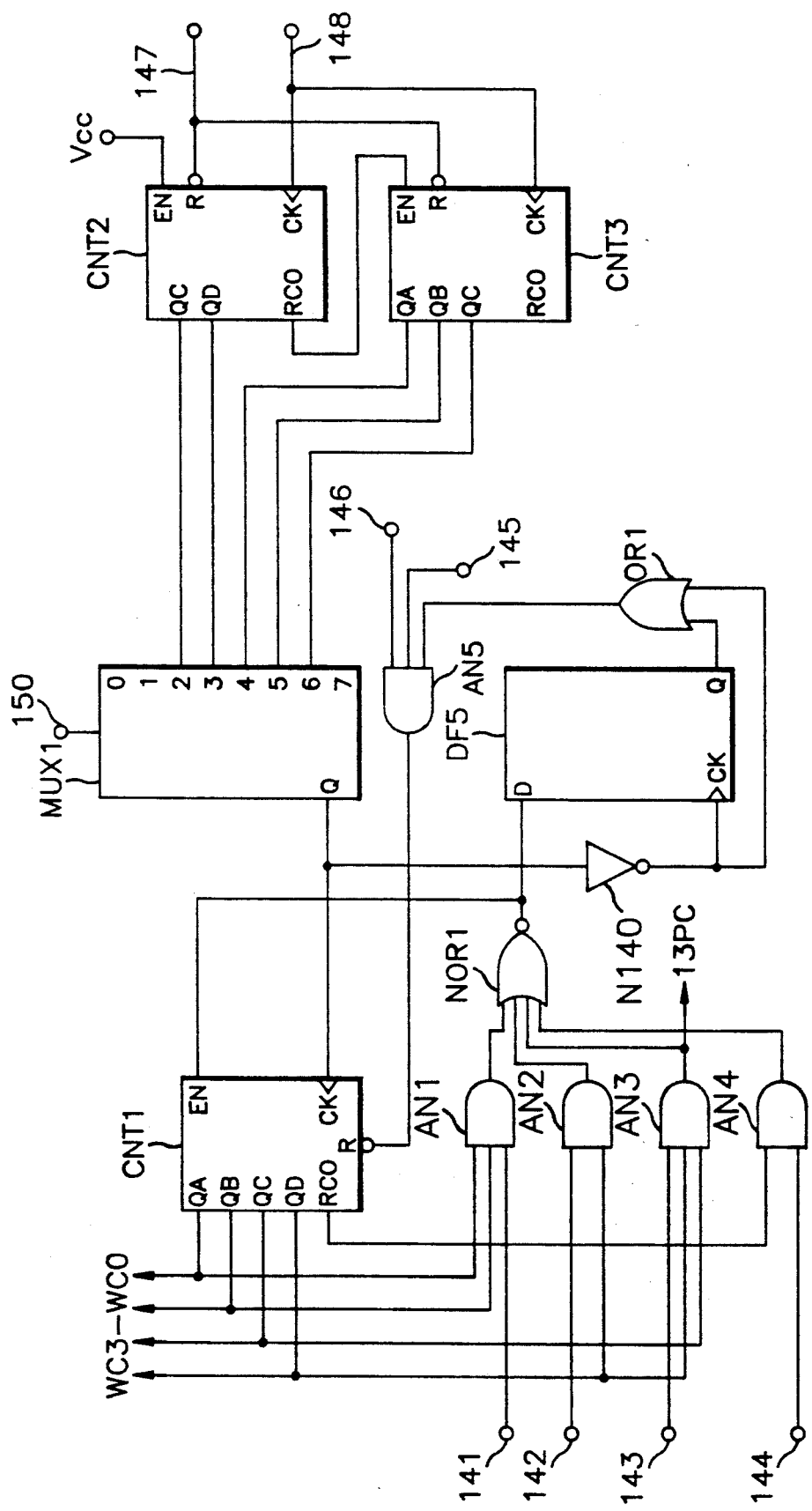
FIG. 6 is a detailed circuit diagram of a writing display controller 140 of FIG. 2 according to the present invention.

FIG. 6 is a detailed circuit diagram of writing display controller 140 of FIG. 2 of the present invention, in which: the writing display controller 140 is connected to the input ports of AND gates AN1 through AN4 of first through fourth display mode selection signal(4p, 9p, 13p, 16p) terminals 141 through 144 in command decoder 10 of FIG. 2; the output ports of AND gates AN1 through AN4 are connected to input port of D-flip/flop DF1 and enable port EN of counter CNT1; an output port Q of D-flip/flop DF1 and an output port of an invertor N140 are fed into OR gate OR2; an output of OR gate OR2 is connected to input port of AND gate AN5 together with a reset terminal 145 and a multi-screen conversion signal terminal 146; an output port of AND gate AN5 is connected with a reset R port of counter CNT1; a reset port 147 and a vertically synchronous signal terminal 148 are connected with reset R ports of counter CNT 2, CNT3 and clock ports CK; output ports QC, QD or QA through QC of the counter CNT2, CNT3 are connected to the input port of multiplexer MUX1; an output of the multiplexer MUX1 is connected to clock port CK of the counter CNT1 and through the invertor 140, to the D-flip/flop DF1 and input port of OR gate OR1; outputs QA through QD of the counter CNT1 generate writing control signals through writing control ports WC 0-WC 3; and outputs A through D of the counter CNT1 and output of ripple carry terminal (RCD) are configured to be entered into AND gates AN1 through AN4.

FIG. 7 is an operation timing diagram of FIG. 6 of the present invention, in which: (7a) is an output signal of the output port Q of the multiplexer MUX1, (7b) is a "high" waveform of third display mode selection(13p) terminal, while first and second display mode selection(4p, 9p) terminals 141, 142 and 4th display mode selection(16p) terminal 144 is "low", (7c) is an input signal of the reset terminal 145 and a multi-screen conversion signal terminal 146, (7d) is an output of the output ports QA through QD of the counter CNT1 and also a control data waveform of the writing control ports WC0 through WC3, (7e) is an enable signal of the output counter CNT1 of the NOR gate NOR 1, (7f) is an output signal of the output port Q of the D-flip/flop PF1.

Figures 8A, 8B, 8C, 8D:
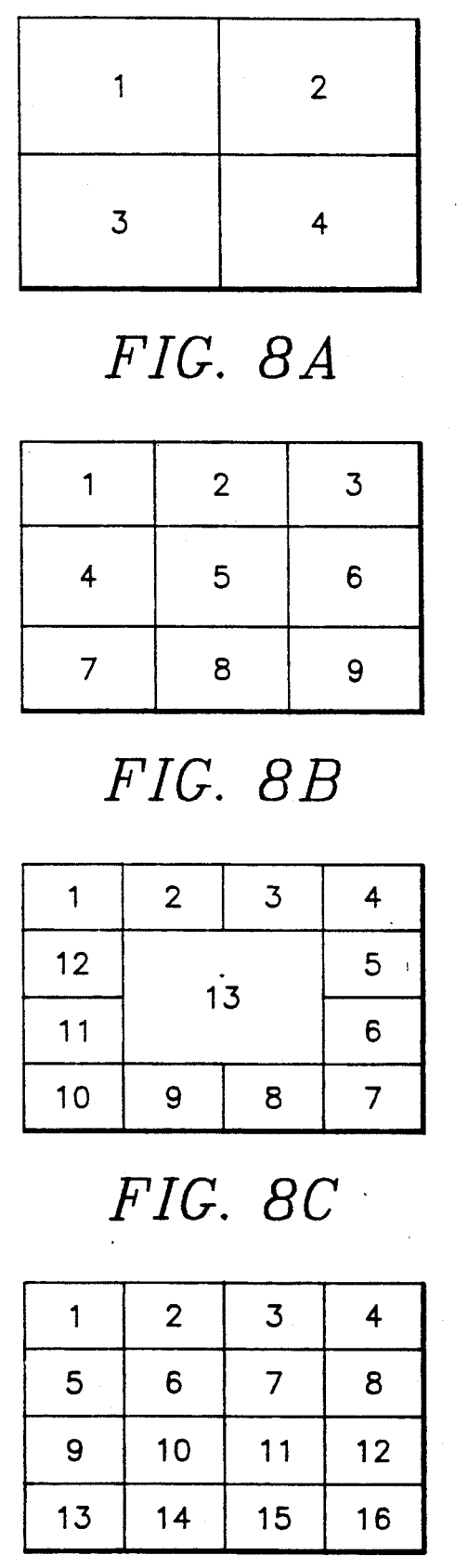

FIG. 8 is an illustrative diagram of an actual configuration of multi-screen, in which: (8A) is an example of 4-screen display, (8B) is an example of 9-screen display, (8C) is an example of 13-screen display, (8D) is an example of 16-screen display, Hereinafter, operation of the present invention is described in detail with reference to FIG. 1 through Figure When the 1-screen is set with reference of vertical: 240 lines and horizontal : 372 dots to write field display on dual port memory(DM1-MD5) of FIG. 1, 3 out of 5 dual-port memories DMI through DM5 are used as Y(YA, YB) and 2 memories of dual port memories DM1 through DM5 are assigned to C(B-Y, R-Y) as band width ratio of luminance signal Y and color signal C is about 4:1.

Dual port memories DMI through DM5 can be configured into areas as in Table 1 below.

TABLE 1

| SCREENS | VER SYNC (line) | HOR SYNC (number) |
|---------|-----------------|-------------------|
| 4 | 120 | 186 |
| 9 | 80 | 124 |
| 13 | 60 for 1-12th screen | 93 |
|  | 120 for 13th screen | 186 |
| 16 | 60 | 93 |

A vertically and horizontally synchronous signal generated in synchronous signal generator 1 by a video signal and 4×3.58 MHz of reference clock terminal(4fsc) are entered into the analog-to-digital clock generator 188 and writing reference signal generator 30, and data to select the same displays as (8A) through (8D) of FIG. 8 is entered through MICOM into command decoder 10.

In this case, display mode selection data 4p, 9p, 13p, 16p of command decoder 10 generated by a display mode selection command is entered into the analog-to-digital clock generator 188 and the writing reference signal generation circuit; 30 at the same time, a clock signal (ADCLK) is generated as a result of conversion of a video signal into a digital signal in analog-to-digital clock generator 188.

Hereinafter, the above operation is described in detail with reference to FIG. 2, in which: a signal (4a), which is the same as the 4 fsc port of FIG. 2 is applied as a clock signal of D-flip/flops DF11;DF12 through the reference clock port 42 of FIG. 3 and D-flip-flops DF11-DF12 are reset according to the input signal (4b) of the reset terminal 41 and horizontally synchronous signal terminals 43 and therefore, initialized; and at this time an analog-to-digital (hereinafter, referred to as "A/D") clock signal is generated based on a selected mode of multi-screen according to input signals of first, second, third screen selection(9p, 4p, 16p) terminals 44, 45, 46.

For example, if a reference clock of 1-screen is the 4 fsc, the 4-screen of 8A of FIG. 8 loses clock by half when a horizontally synchronous signal is taken as a reference signal, so that the clock is divided into and a signal like 4d of FIG. 4 is generated.

In case of PIP or 9-screen of 8B of FIG. 8, a horizontally synchronous signal is scaled down to ⅓, so that a signal like 4C is generated, thereby the 4 fsc is divided into 3.

In case of 16-screen of FIG. 8, a horizontally synchronous signal is divided into 4, so that a signal like 4e is generated, thereby the 4 fsc is divided into 4.

In case of the 13-screen of 8c of FIG. 8, divisions can be made differently on the corresponding horizontal line in such a way that 16-screen and 4-screen can be generated preferentially.

Clocks to generate 4p, 9p, 13p, 16p are converted according to the input logic of the first through third display mode selection terminals 44, 45, 46.

That is, when writing 9P, an output of the NAND gate NA17 3 divisions of 4 fsc, so that the output is generated is the same as the case when the first display mode selection terminal 44 is "high" and second, third display mode selection terminals 45, 46 are "low"; when writing 4p or 13th screen of 13p screen, a signal like 4d is generated if second display mode selection terminal 45 is "high" and first, second display selection terminal 44, 46 are "low"; generated like (4d); and when writing 16p or first through 12th screen of 13p, a signal like 4e is generated if third display mode selection terminal 46 is "high" and first, second display mode selection terminals 44, 45 are low.

Accordingly, based on a input of the horizontally synchronous signal terminal 43 of the AND gate ANII in Figure 2 the 4fsc signal of reference clock terminal 42 is divided as specified by a signal of the first through third display mode selection signal terminals 44-46.

At this time, when it is assumed that output port Q of D-flip/flop DF1 is Q1 and the output port Q of D-flip/-flop DF12 is Q2, Q1 gets 2 divisions and Q2 gets 4 divisions; so that, when 45 column is "high", clock is generated to make 4-screen and when the terminal 46 is "high", a corresponding clock to make 16-screens is output through the NAND gates NA14 through NA17; that are when the outputs of Q1 and Q2 is shifted 00 →11→10 →01 as in FIG. 5, 3 divisions occur because output 10 returns to 00 if the first display mode selection signal terminal 44 is "high"; but, if output is 01 the case is not that of 9-screen.

Accordingly, output of the counter of FIG. 2 changes transiently according to the state of first display mode selection signal terminal 44 and at this time, 4fsc is divided into 3, so that an A/D clock corresponding to 9-screen is supplied.

As above, also in the case of 13- and 16-screen, 4fsc is divided and supplied as an A/D clock (ADCLK) signal of the analog-to-digital converter A/D of FIG. 1, which then is applied to the write timing generator 70; in addition, by writing reference signal generation circuit 30 a writing-begin control signal (WRB) and a memory writing-enable signal (MWE) are applied to the write timing generator 70 according to the display mode selection data and vertically/horizontally synchronous signal of synchronous signal generator 1 and at the same time, fed into the writing display controller 140 and at this time, R-Y, B-Y, Y signals, which are output from demodulator DMR and color difference signal trapper CDT of FIG. 1, are sequentially selected by switch control signal after sampled in the analog-to-digital converter A/D according to an A/D clock, converted into a digital signal, and then entered into the serial-parallel converter 50.

The signal, which is entered into the serial-parallel converter 50, is divided according to first, second luminances YA, YB and color signals based on the control clock (CONCK) of the write timing generator 70, and then is sent to the dual-port memories DM1 through DM5 meanwhile, the writing display controller 140 generates window control signals WCD through WC 3 of FIG. 6 in order to specify row-column address to write together with display mode selection data.

Hereinafter, writing display controller 140 is described in detail with reference to FIG. 6, in which: signals are entered into the first through fourth display mode selection signal (4p, 9p, 13p, 16p) terminals 141 through 144 and outputs of the output ports QA through QD and ripple carry port of the previous counter CNT1 are logicized and corresponding data is generated through the NOR gate NOR1 and herein, as the output of the NOR gate NOR1 is generated like (7e) of FIG. 7, an output of the output port Q of D-flip/flop DF1 is generated like (7f) of FIG. 7. The output, of course, is all reset in an initial stage by the reset terminals 145, 147; however, once the reset is completed and a conversion signal (7C) is entered into a multi screen conversion pulse terminal 146, the counter CNT is shifted into a reset state in order to reset to jump into other mode display; meanwhile, a synchronous signal of vertically synchronous signal terminal 148 is received as a clock signal and counted in the counter CNT2, CNT3 and entered into the multiplexer MUX1, then the multiplexer MUX1 selects the corresponding output value of the counters CNT2, CNT3 under a control of the strobe selector terminal 150 by the command decoding signal which is received from MICOM and the output of output port Q of the multiplexer MUX1 is counted in the counter CNT1; then, window control signals WC3 through WC0 are generated and sent to output ports QA through QD as (7d), and entered into the row-column writing address generation circuits 21, 22, so that a display mode selection can be specified.

But once the first through fourth display mode selection signal terminals 141-144 have counted a corresponding value, then the above operation is reset by the AND gates AN1 through AN4, NOR gate NOR1 and D-flip/flop DF1.

Strobe selector terminal 150 is put under the control of MICOM for the purpose of a strobe time variation at CNT2, CNT3 and MUX1, and then input ports of MUX1 selects an input value of between 1 through 6 according to up or down of output time variation an initial stage.

FIG. 7 describes a case in which 143="high", that is, 12 p(i.e., 13th screen of 13P); herein, it is obvious that CNT1 is disabled when WC0 through WC3 are 12.

Q of DF 1 resets CNT1 with 1 clock delay of output of NOR1, thereby generates a writing display control signal continuously, so that 13 screens can be displayed all at once in one main screen. The method described above works in the same manner for 4p, 9p, 16p, In order to cause a state where writing is performed only once and just the last screen is changed(continuously stopped at 12 after writing the through 12), a setting operation can be performed by using set port of DF1 so that 0 output of NOR 1 is not applied to an input of AN5.

Accordingly, digital video signals of the serial-parallel converter 50 is generated in the row/column writing address generation circuits 21, 22 of address signal generator 20 in accordance with timing signals $\overline{RAS}$, $\overline{CAS}$, $\overline{WE}$, $\overline{DT}$ of the write timing generator 70, and thereby corresponding multi-screen is written in appropriate addresses of dual-port memories DM1 through DM5 selected by the first multiplexer 60 by display mode selection window as desired by a user.

When reading, by a read control signal generated in the command decoder 10, by a horizontally/vertically synchronous signal of main and dual-port memories DMI through DM5 address is generated in the row/-column reading address generation circuits 23, 24 and a selection is made in the first multiplexer 60, then multi-screen data of a corresponding address is read and sent out according to a serial clock SC of the read timing generation circuit 80; the data output is latched in the latch section 90 and is multiplexed in the multiplexer 100 by a control clock (CONCK) generated in the read timing generation circuit 80; the multiplexed data is converted to an analog signal in the digital-to-analog converter D/A according to the clock of D/A of said read timing generation circuit (80); the converted analog signal is encoded in the encoder according to a burstgate pulse and output as a multi/synthetic video signal.

The foregoing description of the operation of the present invention is centered only around 1, 4, 9, 13, 16 multi-screens. It is apparent to those who are skilled in the art without departing from the scope of the present invention which is only limited by the appended claims, that not only the multi-screens but also various modifications such as 2-screen scroll and PIP functions as described below are easily possible when 2-screen and PIP is applied to the display mode selection signal.

The 2-screen scroll is basically the same as the 1-screen digital video signal; in the 2-screen scroll, an analog-video signal is divided vertically so that two sources of the analog video can be displayed at once; in case of such PIP, an A/D clock and a vertical skip(-writes only 1H out of 3H's) structure as same the that of 9-screen are exploited, and conventional PIP can be realized if a screen location is specified and analog video mixing is performed like in scroll.

As described above, the present invention has such advantages that display mode selection data is received and A/D clock converts the data accordingly and also controls a window control signal and address values, which are divided across memory areas, are loaded according to a window control signal, thereby any display mode among plurality of display modes(1-screen, 4-screen, 9-screen, 13-screen, 16-screen) can be selected and displayed; the 2-screen and PIP function becomes possible by mixing analog video signals into a digital video output; in case of the display, two sources of the display can be displayed vertically, so that the scroll function is realized by shifting a vertical to two horizontal ones.

What is claimed is:

1. A multi-screen generation circuit for a digital color television and a video tape recorder including plural dual-port memories, a synchronizing signal generator, a microcomputer, an analog-to-digital converter and a digital-to-analog converter, said circuit comprising:

command decoder means for receiving vertical synchronizing signals from the synchronizing signal generator to generate display ode selection data by decoding multi-screen mode command data together with control signals generated by said microcomputer;

address signal generator means having row/column writing and row/column reading address signal generation circuits dividing image data, for display in a number of multi-screen modes in each domain of a video screen and providing writing address signals to said plural dual-port memories;

write reference signal generator means for receiving vertical/horizontal synchronizing signals generated from the synchronizing signal generator and display mode selection data from said command decoder means to provide a write begin signal and a write enable signal;

write display controller means coupled to receive vertical synchronizing signals and display mode selection data, for designating row/column writing address signal generation circuits of said address signal generator means to receive said display mode selection data;

analog-to-digital clock generator means coupled to receive horizontal synchronizing signals generated from said synchronizing signal generator, a basic clock signal and said display mode selection data, for demultiplying said basic clock signal in accordance with said display mode selection data to provide first clock signals to the analog-to-digital converter;

first multiplexer means for multiplexing said writing address signals generated from said address signal generator means to provide address data to said plural dual-port memories;

write timing generator means coupled to receive said first clock signals, for digitalizing video signals according to said display mode selection data, and said write-enable and write-begin signals to generate a second clock signal, address switching signals, a plurality of data transmission signals for controlling transmission of row/column address strobes and write enable signals to the plural dual-port memories;

serial-parallel converter means for receiving serial digitized signals of said video signals having first and second luminance components and chrominance components generated from said analog-to-digital converter to parallelly generate first and second luminance signals and a chrominance signal in accordance with said second clock signal;

read timing generator means for receiving horizontal synchronizing signals and said basic clock signal to generate burst gate pulses and control clock signals for the digital-to analog converter, and serial clock signals and control timing signals;

latch means for outputting multi-screen address data designated by the generation of row/column reading address signal generation circuits of said address signal generator means by latching said first and second luminance signals and said chrominance signal in accordance with said serial clock signals; and multiplexer means for mixing data of the latched first and second luminance signals and chrominance signal in accordance with said control timing signals to provide mixed data to the digital-to-analog converter.

2. A multi-screen generation circuit having various multi-screen display modes comprising:

input means arranged to receive video signals;

processor means, including a microcomputer and plural dual-port memories arranged to generate, from said received video signals, serial digital video data representative of a plurality of discrete video picture, wherein said processor means comprises:

command decoder means for receiving multi-screen conversion signals representative of selected ones of various multi-screen display modes and for providing display mode selection data;

means for converting said serial digital video data to parallel digital video data;

address generator means responsive to synchronizing signals and said display mode selection data, for controlling writing of said parallel digital data into said plural dual-port memories, wherein said parallel digital data written into said plural dual-port memories represents said serial digital video data representative of a plurality of discrete video pictures, said address generator means further responsive to said synchronizing signals for controlling reading of digital data from said plural dual port memories;

timing signal generator means responsive to said synchronizing signals and a color subcarrier signal for generating a serial control clock signal, a multiplex control signal, burst gate pulses and digital-to-analog clock pulses;

means responsive to said serial control clock signal and said multiplex control signal for converting said parallel digital data read from said plural dual-port memories to output serial digital video data; and output means arranged to output a composite video signal containing said serial digital video data, such that said plurality of discrete pictures may be displayed simultaneously upon a common screen each in a respective portion of the screen, wherein said various multi-screen display modes are selected under control of said microcomputer for varying the number of plural simultaneously displayed discrete pictures depending on selected ones of said various multi-screen display modes.

3. The multi-screen generation circuit having various multi-screen display modes as set forth in claim 2, wherein said video signals are color video signals, and wherein said input means comprises:

color demodulator means for demodulating said color video signals and for providing a luminance signal, color difference signals and synchronizing signals; and analog-to-digital converter means for digitizing said luminance and color difference signals to provide serial digital video data wherein said serial digital video data and said synchronizing signals represent said received video signals that are provided to said processing means.

4. The multi-screen generation circuit having various multi-screen display modes as set forth in claim 2, wherein said output means comprises:

digital-to-analog converter means responsive to said digital-to-analog clock pulses, for converting said serial digital video data into analog data signals; and encoder means responsive to said burst gate pulses, for synchronizing said analog data signals and for synthesizing said synchronized analog data signals to provide said composite video signal.

5. A multi-screen display circuit having various multi-screen display modes for color video signals comprising:
   demodulator means for receiving color video signals and for outputting synchronization signals, luminance signals and color difference signals;
   analog-to-digital converter means for converting said luminance and color difference signals to digital data under control of analog-to-digital clock signals;
   a microcomputer for providing multi-screen conversion control signals;
   controller means for receiving said synchronization signals, said multi-screen conversion control signals, said digital data and a multiple of a color subcarrier signal of said color video signals and for generating said analog-to-digital clock signals, digital-to-analog clock signals, burst gate pulses, memory address signals and memory address control signals, and for processing said digital data to provide parallel digital data to a memory means said memory means having first, second, third and fourth dual-port memories for storing said parallel digital data from said controller means under control of said memory address control signals and said memory address signals, wherein said controller means comprises:
   sync signal generator means for receiving said synchronization signals from said demodulator and for generating horizontal sync signals and vertical sync signals;
   command decoder means responsive to said multi-screen conversion control signals and said vertical sync signals, for generating display mode selection data;
   A/D clock generator means responsive to said display mode selection data, said multiple of a color subcarrier signal of said color video signal and said horizontal sync signals, for generating said analog-to-digital clock signals;
   timing signal generator means responsive to said multiple of a color subcarrier signal of said color video signal and said horizontal sync signals, for generating said burst gate pulses, said digital-to-analog clock signals, a serial clock signal and a data multiplex control clock;
   means for providing said memory address signals, said memory address control signals and said parallel digital data to said first, second, third and fourth dual-port memories of said memory means;
   means for converting said parallel digital data output from said first, second, third and fourth dual-port memories to serial digital data;
   plural digital-to-analog converter means for converting said serial digital data to analog signals under control of said digital-to-analog clock signals; and
   encoder means for synchronizing said analog signals under control of said burst gate pulses from said controller means for providing synthesized video signals configured for display in one of said various multi-screen display modes.

6. The multi-screen display circuit having various multi-screen display modes for color video signals as set forth in claim 5, wherein said A/D clock generator means comprises:
   a first input terminal for receiving a reset signal and for providing said reset signal to a first input of a first AND gate via an inverter;
   a second input terminal connected to a second input of said first AND gate, for receiving said horizontal sync signals, wherein said first AND gate provides an output for initializing said A/D clock generator means under control of said reset signal and said horizontal sync signals; and
   means having three input terminals for receiving said display mode selection data, said multiple of a color subcarrier signal and the output of said first AND gate for generating said analog-to-digital clock signals.

7. The multi-screen display circuit having various multi-screen display modes for color video signals as set forth in claim 5 wherein said controller means further comprises:
   write reference signal generator means responsive to said horizontal sync signals, said vertical sync signals and said display mode selection data, for generating a write begin signal and a first write enable signal;
   write timing generator means responsive to said write begin signal, said first write enable signal and said analog-to-digital clock signals for generating serial-to-parallel control signals, row address strobe signals, column address strobe signals, a second write enable signal and data transmission control signals;
   serial-to-parallel converter means for receiving said digital data to provide said parallel digital data to said memory means in response to said serial-to-parallel control signals;
   write display controller means responsive to said vertical sync signals, said display mode selection data, and a reset signal, for generating write control signals;
   address generator means including a row/column write address generator means responsive to said write control signals and said display mode selection data for generating row write address signals and column write address signals; said address generating means further including a row/column read address generator means responsive to said vertical sync signals, said horizontal sync signals and said multiple of a color subcarrier signal for generating row read address signals and column read address signals; and
   multiplexer means responsive to said data transmission control signals, for providing said row write address signals, said column write address signals, said row read address signals and said column read address signals to said memory means.

8. The multi-screen display circuit having various multi-screen display modes for color video signals as set forth in claim 5, wherein said means for converting said parallel digital data output from said first, second, third and fourth dual-port memories to serial digital data, comprises:
   latch means responsive to said serial clock signal, for receiving said parallel digital data output from said first, second, third and fourth dual-port memories to provide said parallel digital data; and
   data multiplexer means for receiving said parallel digital data output to provide said serial digital data to said plural digital-to-analog converter means in response to said data multiplex control clock.

9. The multi-screen display circuit having various multi-screen display modes for control video signals as set forth in claim 7, wherein said serial-to-parallel converter means provides first and second digital luminance signals, and a digital color signal in parallel to said first, second, third and fourth dual port memories for storage.

10. A multi-screen generation circuit of a digital color television and a video tape recorder including a plural dual-port memories, a synchronizing signal generator, a microcomputer, an A/D and D/A converters, said circuit comprising:

command decoder means for receiving multi-display selection data representing multi-display modes established by a user and a vertical synchronizing signal generated from the synchronizing signal generator to make determinations of a display mode for generating selected display mode data for performing read/write functions in accordance with said determinations;

write display controller means for receiving said selected display mode data and said vertical synchronizing signal to generate a plurality of write control signals;

write reference signal generator means for receiving said vertical synchronizing signal, a horizontal synchronizing signal generated from said synchronizing signal generator and said selected display mode data to generate a write start signal and a write enable signal;

A/D clock generator means for receiving a reference clock signal and said horizontal synchronizing signal to generate a first clock signal in accordance with said selected display mode data to said A/D converters for converting video analog data into video digital data;

write timing generator means for receiving said first clock signal, and write start signal and said write enable signal to generate a switch control signal to control said video analog data, a plurality of control signals to the plural dual-port memories, a second clock signal and an address switching signal;

serial-parallel converter means for receiving said video digital data to parallelly generate a chrominance signal and luminance signals in accordance with said second clock signal;

address generator means for receiving said plurality of write control signals, said selected display mode data, said reference clock signal and said vertical and horizontal synchronizing signals to generate a plurality of parallel write/read address signals;

first multiplexer means for multiplexing said plurality of parallel read/write address signals in accordance with said address switching signal and data transmission signal to generate a serial read/write address signals to said plural dual-port memories;

read timing generator means for receiving said horizontal synchronizing signal and said reference clock signal to generate a burst gate pule and a third clock signal to said D/A converters, a fourth clock signal and a serial clock signal;

latch means for latching between said chrominance signal and luminance signals in accordance with said serial clock signal to generate latched chrominance and luminance signals; and second multiplexer means for multiplexing said latched chrominance and luminance signals in accordance with said third clock signal to said D/A converters.

11. The multi-screen generation circuit as claimed in claim 10, wherein said address generator means having first and second row/column writing address signal generators for receiving said plurality of write control signals and said selected display mode data to generate first and second parallel write address signals, and first and second row/column reading address signal generators for receiving said vertical and horizontal synchronizing signals and said reference clock signal to generate first and second parallel read address signals.

12. The multi-screen generation circuit as claim in claim 10, wherein said A/D clock generator means comprises:

first terminal means for receiving a reset signal to reset said horizontal synchronizing signal for generating an initialized signal, and for receiving said reference clock signal to drive first and second flip-flops;

second terminal means having a plurality input terminals for receiving corresponding first, second and third display modes respectively representative of 4-pictures, 9-pictures and 16-pictures modes of said multi-display selection data;

first and second flip-flop means for receiving one display mode of said multi-display selection data to generate first and second identified states in accordance with said reference clock signal and said initialized signal; and a plurality of gating means for determining a selected display mode data generated from said command decoder means for identifying logic states of said first, second and third display modes and said first and second identified states generated from said first and second flip-flop means to generate said first clock signal in accordance with said selected display mode.

13. The multi-screen generation circuit as claimed in claim 10, wherein said write display controller means comprises:

first and second counter means for receiving said vertical synchronizing signal and a first reset signal to generate a plurality of clock signals;

multiplexer means for multiplexing said plurality of clock signals to generate a timing clock signal;

plurality of gating means having a plurality input terminals, for receiving corresponding first, second, third and fourth display modes respectively representative of 4-pictures, 9-pictures, 13-pictures and 16-pictures modes of said multi-display selection data to make determinations of a display mode of said selected display mode data of said multi-display selection data to provide an enabling signal;

controller reset means comprising a flip-flop, an OR gate and a NAND gate, wherein said flip-flop receives said enabling signal at a data terminal and said timing clock signal at a clock terminal to generate a second reset signal, and OR gate receives said second reset signal and an inverted timing clock signal to generate a third reset signal, and said NAND gate receives said first and third reset signals and said selected display mode data to generate a fourth reset signal; and third counter means for receiving said enabling signal at an enable terminal, said timing clock signal at a clock terminal, and said fourth reset signal at a reset terminal to generate said plurality of control signals.

14. A multi-screen generation circuit of a digital color television and a video tape recorder including a plural dual-port memories, a synchronizing signal generator, a microcomputer, said circuit comprising:

command decoder means for receiving multi-display selection data representing multi-display modes established by a user and a vertical synchronizing signal generated from the synchronizing signal generator to make determinations of a display mode for generating selected display mode data for performing read/write functions in accordance with said determinations;

write display controller means for receiving said selected display mode data and said vertical synchronizing signal to generate a plurality of write control signals;

write reference signal generator means for receiving said vertical synchronizing signal, a horizontal synchronizing signal generated from said synchronizing signal generator and said selected display mode data to generate a write start signal and a write enable signal;

clock generator means for receiving a reference clock signal and said horizontal synchronizing signal to generate a first clock signal in accordance with said selected display mode data;

write timing generator means for receiving said first clock signal, said write start signal and said write enable signal to generate a switch control signal to control video analog data, a plurality of control signals to the plural dual-port memories, a second clock signal and an address switching signal;

serial-parallel converter means for receiving said video digital data to parallelly generate a chrominance signal and luminance signals in accordance with said second clock signal;

address generator means for receiving said plurality of write control signals, said selected display mode data, said reference clock signal and said vertical and horizontal synchronizing signals to generate a plurality of parallel write/read address signals;

first multiplexer means for multiplexing said plurality of parallel read/write address signals in accordance with said address switching signal and data transmission signal to generate serial read/write address signals to said plural dual-port memories;

read timing generator means for receiving said horizontal synchronizing signal and said reference clock signal to generate a burst gate pulse, a third clock signal, a fourth clock signal and a serial clock signal;

latch means for latching between said chrominance signal and luminance signals in accordance said serial clock signal to generate latched chrominance and luminance signals; and second multiplexer means for multiplexing said latched chrominance and luminance signals in accordance with said fourth clock signal.

15. The multi-screen generation circuit as claimed in claim 14, wherein said address generator means having first and second row/column writing address signal generators for receiving said plurality of write control signals and said selected display mode data to generate first and second parallel write address signals, and first and second row/column reading address signal generators for receiving said vertical and horizontal synchronizing signals and said reference clock signal to generate first and second parallel read address signals.

16. The multi-screen generation circuit as claimed in claim 14, wherein said clock generator means comprises:

first terminal means for receiving a reset signal to reset said horizontal synchronizing signal for generating an initialized signal, and for receiving said reference clock signal to drive first and second flip-flops;

second terminal means having a plurality input terminals for receiving corresponding first, second and third display modes respectively representative of 4-pictures, 9-pictures and 16-pictures modes of said multi-display selection data;

first and second flip-flop means for receiving one display mode of said multi-display selection data to generate first and second identified states in accordance with said reference clock signal and said initialized signal; and a plurality of gating means for determining a selected display mode data generated from said command decoder means by identifying logic states of said first, second and third display modes and said first and second identified states generated from said first and second flip-flop means to generate said first clock signal in accordance with said selected display mode.

17. The multi-screen generation circuit as claimed in claim 14, wherein said write display controller means comprises:

first and second counter means for receiving said vertical synchronizing signal and a first reset signal to generate a plurality of clock signals;

multiplexer means for multiplexing said plurality of clock signals to generate a timing clock signal;

a plurality of gating means having a plurality input terminals, for receiving corresponding first, second, third and fourth display modes respectively representative of 4-pictures, 9-pictures, 13-pictures and 16-pictures modes of said multi-display selection data to make determinations of a display mode of said selected display mode data of said multi-display selection data to provide an enabling signal;

controlling reset means comprising a flip-flop, an OR gate and a NAND gate, wherein said flip-flop receives said enabling signal at a data terminal and said timing clock signal at a clock terminal to generate a second reset signal, and OR gate receives said second reset signal and an inverted timing clock signal to generate a third reset signal, and said NAND gate receives said first and third reset signals and said selected display mode data to generate a fourth reset signal; and third counter means for receiving said enabling signal at an enable terminal, said timing clock at a clock terminal, and said fourth reset signal at a reset terminal to generate said plurality of control signals.

* * * * *

UNITED STATES PATENT AND TRADEMARK OFFICE
CERTIFICATE OF CORRECTION

PATENT NO. : 5,161,012
DATED : 3 November 1992
INVENTOR(S) : Hoon-Sun CHOI

It is certified that error appears in the above-indentified patent and that said Letters Patent is hereby corrected as shown below:

TITLE PAGE

Abstract: [57] line 6     after "type of", insert --said--;

| | | |
|---|---|---|
| Column 1, | line 25, | before "manufacturer", insert --the--; |
| | line 28, | after "9-screen,", change "2-screen" to --12-screen--; |
| | line 52, | before "is", change "Figure ;" to --FIG. 1--; |
| Column 2, | line 11, | after " (CDT)", delete " ,"; |
| | line 12, | after "signals", insert -- , --; |
| | line 20, | before "through", change "DMl" to --DM1--; |
| | line 23, | before "through", change "DMl" to --DM1--; |
| | line 29, | after "includes", insert -- : --; |
| | line 31, | before "signal generator", insert --or synchronizing--; |
| | line 32, | after "together", change "withserial" to --with serial--; |
| | line 36, | before "address", insert --therethrough; an--; |

UNITED STATES PATENT AND TRADEMARK OFFICE
CERTIFICATE OF CORRECTION

PATENT NO. : 5,161,012
DATED : 3 November 1992
INVENTOR(S) : Hoon-Sun CHOI

It is certified that error appears in the above-indentified patent and that said Letters Patent is hereby corrected as shown below:

| | | |
|---|---|---|
| Column 2, | line 39, | before "into", change "modes" to --pictures--; |
| | line 40, | after "generates", delete "writing"; |
| | line 50, | before "mode", change "displays" to --the display--; |
| | line 61, | before " 1 ", delete "the"; |
| | line 67, | before "through", change "DMI" to --DM1--; |
| | line 68, | before " a ", change "Figure 1" to --FIG. 1--; |
| | | before "serial-parallel", insert --demultiplexer or--; |
| Column 3, | line 2, | before "through", change "DMI" to --DM1--; |
| | line 5, | before "under", change "(CC)" to --(C)--; |
| | line 8, | before "for", change "(AD Clk) " to --(AD CLK)--; |
| | line 13, | after "signals", insert --(YA, YD) and color signal (G)--; |
| | line 32, | after "(SC)", delete "column (SC)"; |
| | line 34, | after "color", change " C " to --YC--; |
| | line 40, | after "generator", insert --(A/D CLK)--; |

UNITED STATES PATENT AND TRADEMARK OFFICE
CERTIFICATE OF CORRECTION

PATENT NO. : 5,161,012
DATED : 3 November 1992
INVENTOR(S) : Hoon-Sun CHOI

It is certified that error appears in the above-indentified patent and that said Letters Patent is hereby corrected as shown below:

| | | |
|---|---|---|
| Column 3, | line 40, | after "188 of", change "Figure 2" to --FIG. 2--; |
| | line 50, | after "DF11", delete " ; "; |
| | line 60, | after "NA12", insert -- , --; |
| Column 4, | line 27, | before "46 is", change "terminals" to --the terminal--; |
| | line 28, | before "44, 45", change "the termnal" to --terminals--; |
| | line 34, | after "140", change "is" to --has--; |
| | line 35, | after "AN4", delete "of"; |
| | line 37, | after "144", change "in" to --from the--; |
| | line 42, | after "gate", change "OR2" to --OR1--; |
| | line 43, | after "gate", change "OR2" to --OR1--; |
| | line 54, | before "invertor", change "140" to --N140--; |
| | line 58, | before "of the counter", change "A through D" to --QA thorugh QD--; |
| Column 5, | line 7, | change "PF1." to --DF1.--; |
| | line 15, | change "Figure" to --FIG. 8.--; |
| | line 18, | after "DM1-", change "MD5" to --DM5--; |

UNITED STATES PATENT AND TRADEMARK OFFICE
CERTIFICATE OF CORRECTION

PATENT NO. : 5,161,012
DATED : 3 November 1992
INVENTOR(S) : Hoon-Sun CHOI

It is certified that error appears in the above-indentified patent and that said Letters Patent is hereby corrected as shown below:

| | | |
|---|---|---|
| Column 5, | line 19, | before "through", change "DMI" to --DM1--; |
| | line 24, | before "through", change "DMI" to --DM1--; |
| | line 47, | after "generation", change "circuit; 30" to --circuit 30;--; |
| | line 48, | after "signal", change "(ADCLK)" to --(AD CLK)--; |
| | line 54, | after "DF11", change " ; " to -- , --; |
| Column 6, | line 16, | after "NA 17", insert --is--; after "output", delete "is"; |
| | line 29, | after "gate", change "ANII" to --AN11--; |
| | line 30, | after "in", change "Figure 2" to --FIG. 3, --; |
| | line 34, | before "is Q1", change "DF1" to --DF11--; |
| | line 40, | after "that", change "are" to --is, --; before "shifted", change "is" to --are--; |
| | line 43, | after "01", insert -- , --; |
| Column 7, | line 6, | after "DM5", insert -- ; --; |
| | line 7, | before "through", change "WCD" to --WC0--; |
| | line 24, | after "CNT", insert -- 1 --; |

UNITED STATES PATENT AND TRADEMARK OFFICE
CERTIFICATE OF CORRECTION

PATENT NO. : 5,161,012
DATED : 3 November 1992
INVENTOR(S) : Hoon-Sun CHOI

It is certified that error appears in the above-indentified patent and that said Letters Patent is hereby corrected as shown below:

| | | |
|---|---|---|
| Column 7, | line 48, | after "between", change " 1 " to -- 2 --; |
| | line 52, | before "13th", change "12 p(i.e.," to --12p (i.e.,--; |
| | line 61, | after "writing", change "the" to -- 0 --; |
| | line 63, | after "that", change " 0 " to --the--; |
| Column 8, | line 9, | before "through", change "DMI" to --DM1--; |

IN THE CLAIMS

| | | |
|---|---|---|
| Column 8, | line 65, | after "display", change "ode" to --mode--; |
| Column 10, | line 24, | after "subcarrier signal", insert -- , --; |
| | line 29, | after "control signal", insert -- , --; |
| | line 53, | after "video data", insert -- , --; |
| Column 11, | line 21, | after "means", insert -- , --; |
| | line 59, | after "means", insert --and--; |
| Column 12, | line 7, | after "terminals", insert -- , --; |
| | line 14, | after "claim 5", insert -- , --; |
| Column 13, | line 34, | after "clock signal, ", change "and" to --said--; |
| | line 56, | after "gate", change "pule" to --pulse--; |

UNITED STATES PATENT AND TRADEMARK OFFICE
CERTIFICATE OF CORRECTION

PATENT NO. : 5,161,012
DATED : 3 November 1992
INVENTOR(S) : Hoon-Sun CHOI

It is certified that error appears in the above-indentified patent and that said Letters Patent is hereby corrected as shown below:

| | | |
|---|---|---|
| Column 14, | line 9, | after "as", change "claim" to --claimed--; |
| | line 29, | after "means", change "for" to --by--; |
| | line 43, | before "plurality", insert -- a --; (first occurrences) |
| | line 55, | before "OR", change "and" to --said--; |
| Column 15, | line 51, | after "accordance", insert --with--; |
| Column 16, | line 47, | before "reset", change "controlling" to --controller--; |
| | line 51, | before "OR", change "and" to --said--; |
| | line 58, | after "timing clock", insert --signal--; |

Signed and Sealed this

Fifteenth Day of October, 1996

*Attest:*

BRUCE LEHMAN

*Attesting Officer*        *Commissioner of Patents and Trademarks*